(12) United States Patent
Choe et al.

(10) Patent No.: US 8,009,905 B2
(45) Date of Patent: Aug. 30, 2011

(54) SYSTEM, MEDIUM, AND METHOD WITH NOISE REDUCING ADAPTIVE SATURATION ADJUSTMENT

(75) Inventors: Won-hee Choe, Gyeongju-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 969 days.

(21) Appl. No.: 11/892,653

(22) Filed: Aug. 24, 2007

(65) Prior Publication Data
US 2008/0137946 A1    Jun. 12, 2008

(30) Foreign Application Priority Data
Dec. 11, 2006    (KR) .......................... 10-2006-0125648

(51) Int. Cl.
*G06K 9/00*    (2006.01)

(52) U.S. Cl. ...................................................... 382/167

(58) Field of Classification Search .......... 382/162–167; 358/1.9, 500, 518–520, 523; 348/29, 34
See application file for complete search history.

(56) References Cited

U.S. PATENT DOCUMENTS

| | | | | | |
|---|---|---|---|---|---|
| 5,534,915 A | * | 7/1996 | Sandrew | ...................... | 348/29 |
| 5,612,795 A | * | 3/1997 | Dichter | ........................ | 358/518 |
| 5,999,703 A | * | 12/1999 | Schwartz et al. | .............. | 358/1.9 |
| 6,075,886 A | * | 6/2000 | de Queiroz | ................... | 382/164 |

FOREIGN PATENT DOCUMENTS

| | | |
|---|---|---|
| CN | 1477598 | 2/2004 |
| CN | 1856117 | 11/2006 |
| JP | 6-197244 | 7/1994 |
| JP | 2004-172987 | 6/2004 |
| JP | 2005-275581 | 10/2005 |
| JP | 2006-295845 | 10/2006 |
| KR | 10-2006-0089951 | 8/2006 |

OTHER PUBLICATIONS

Chinese Office Action dated Feb. 5, 2010 corresponds to Chinese Patent Application No. 200710196828.9.

* cited by examiner

*Primary Examiner* — Jose Couso
(74) *Attorney, Agent, or Firm* — Staas & Halsey LLP (57) ABSTRACT

A system, medium, and method with noise reducing adaptive saturation adjustment. The system with adaptive saturation adjustment includes a luminance value extracting unit extracting luminance values of an input image, and a saturation adjusting unit adjusting saturation components of the input image on the basis of the extracted luminance values.

29 Claims, 5 Drawing Sheets

FIG. 3A $dS1 \leq \Delta Sall \leq dS2$
$dS1 \leq 0 \leq dS2$

SYSTEM, MEDIUM, AND METHOD WITH NOISE REDUCING ADAPTIVE SATURATION ADJUSTMENT

CROSS-REFERENCE TO RELATED APPLICATIONS

This application claims priority from Korean Patent Application No. 10-2006-0125648 filed on Dec. 11, 2006 in the Korean Intellectual Property Office, the disclosure of which is incorporated herein by reference in its entirety.

BACKGROUND OF THE INVENTION

1. Field of the Invention

One or more embodiments of the present invention relate to a system, medium, and method with adaptive saturation adjustment, and more particularly, to a system, medium, and method with noise reducing adaptive saturation adjustment.

2. Description of the Related Art

Generally, a technique for improving saturation of an image includes changing levels of saturation components included in corresponding image information. Ideally, when saturation components of an image are properly changed, the image is clearly perceived by the human eye. Representative saturation improving techniques can be classified into non-adaptive techniques performing saturation improvement independently from images and adaptive techniques where the level of saturation improvement depends on the contents of images.

As noted, ideally, when an input image has no noise, regardless of the saturation improving technique used, the color of the image is improved as intended. However, in actuality, input images include camera noise and MPEG compression noise, for example. Such camera noise can be caused by characteristics of corresponding image acquiring devices, such as cameras or camcorders, when images are generated and such MPEG noise may be caused by the compression in the image, e.g., during a transmitting or storing process. Therefore, when the color of an image is improved without taking into consideration the characteristics of noise, color noise actually becomes more prominent and noticeable.

SUMMARY OF THE INVENTION

An aspect of one or more embodiments of the present invention is to provide an system, medium, and method with noise reducing adaptive saturation adjustment.

Additional aspects and/or advantages of the invention will be set forth in part in the description which follows and, in part, will be apparent from the description, or may be learned by practice of the invention.

To achieve the above and/or other aspects and advantages, embodiments of the present invention include a system with adaptive saturation adjustment, the system including a luminance value extracting unit to extract luminance values of an image, and a saturation adjusting unit to selectively adjust respective saturation components of select portions of the image based on the extracted luminance values.

To achieve the above and/or other aspects and advantages, embodiments of the present invention include a method with adaptive saturation adjustment, the method including extracting luminance values of an image, and selectively adjusting respective saturation components of select portions the image based on the extracted luminance values.

To achieve the above and/or other aspects and advantages, embodiments of the present invention include a system with adaptive saturation adjustment, the system including a luminance value extracting unit to identify respective pixel luminance values and average luminance values of an image, and a saturation adjusting unit to selectively adjust saturation components of select pixels of the image based on the identified respective pixel luminance values and average luminance values.

To achieve the above and/or other aspects and advantages, embodiments of the present invention include a method of adaptive saturation adjustment, the method including identifying respective pixel luminance values and average luminance values of an image, and selectively adjusting saturation components of select pixels of the image based on the identified respective pixel luminance values and average luminance values.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
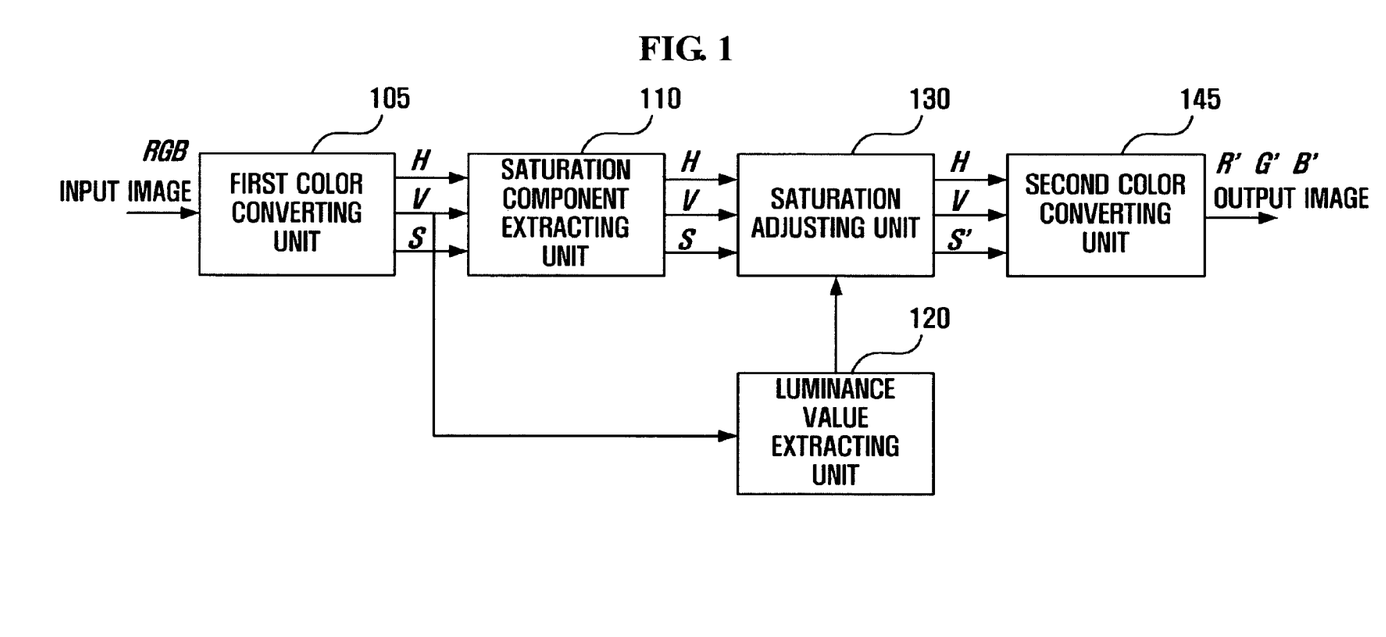
FIG. 1 illustrates a system with adaptive saturation adjustment, according to an embodiment of the present invention.

FIG. 1 illustrates a system with noise-reduced adaptive saturation adjustment, according to an embodiment of the invention. The system may include a first color converting unit 105, a saturation component extracting unit 110, a luminance value extracting unit 120, a saturation adjusting unit 130, and a second color converting unit 145, for example.

The first color converting unit 105 may convert an input image, e.g., represented by coordinate values in a first color space, into a converted image, e.g., represented by coordinate values in a second color space. Saturation components may further be extracted from the converted image.

Here, in one embodiment, each of the coordinate values in the first color space may be an RGB (Red, Green, and Blue) value, noting that embodiments are not limited thereto.

In addition, as only an example, coordinate values in the second color space may be an HSV (Hue, Saturation, and Value) value having three values representing the hue, saturation, and brightness of a color, again noting that embodiments are not limited thereto.

The saturation component extracting unit 110, for example, may receive the converted image from the first color converting unit 105 and extract saturation components from the converted image.

The luminance value extracting unit 120 may receive the converted image from the first color converting unit 105 and extract luminance values from the converted image.

Here, each of the luminance values may include at least one of an average luminance value of the converted image and an input pixel luminance value, as a luminance value of a pixel of the converted image.

In an embodiment, the luminance value extracting unit 120 may also include a storage unit (not shown) for storing the luminance values of pixels, noting that alternatives are also available.

The saturation adjusting unit 130 may receive the saturation components from the saturation component extracting unit 110, modify the saturation components to modified saturation components based on the extracted luminance values, e.g., input from the luminance value extracting unit 120, and reflect the modified saturation components in the converted image so as to generate a first output image. That is, the saturation adjusting unit 130 may adjust saturation components of the input image based upon average luminance values, for example.

An example detailed operation of the saturation adjusting unit 130 will be described in greater detail below with reference to FIG. 2.

The second color converting unit 145 may receive the first output image, e.g., from the saturation adjusting unit 130, and convert the first output image represented by coordinate values in the second color space into a second output image represented by coordinate values in the first color space, for example.

Such a system in FIG. 1, with adaptive saturation adjustment, according to the embodiment of the invention, can be used as, with, and/or for image display systems, image processing chips or hardware (HAN) systems capable of driving those image display systems, image processing chips or HAN systems included in image generating systems, etc. However, an application field for such a system with adaptive saturation is not limited thereto.

Figure 2:
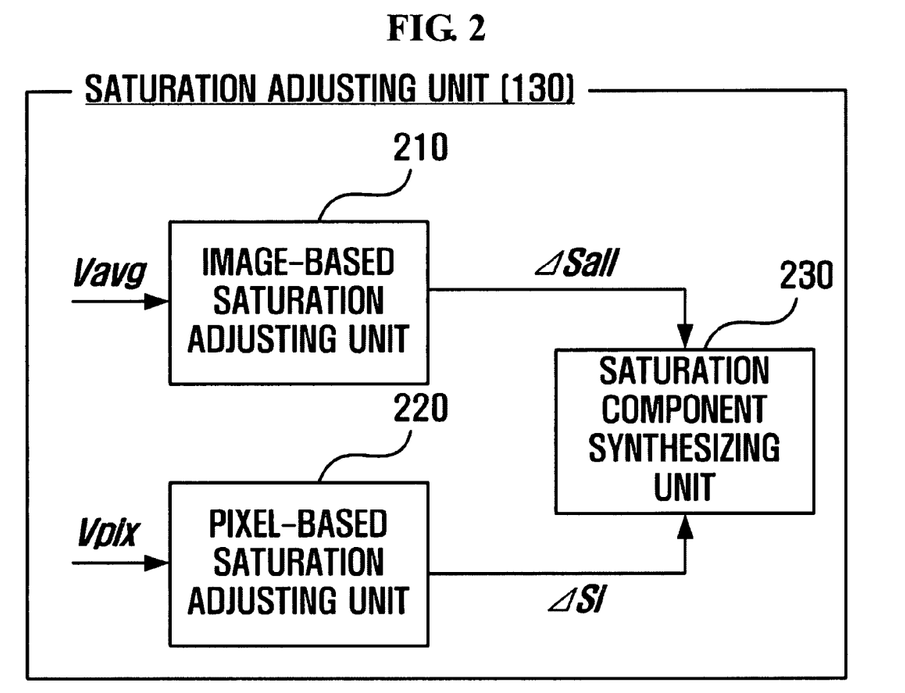
FIG. 2 illustrates a saturation adjusting unit, such as that shown in FIG. 1, according to an embodiment of the present invention.

FIG. 2 illustrates a saturation adjusting unit 130, such as that shown in FIG. 1, according to an embodiment of the present invention. The system may include an image-based saturation adjusting unit 210, a pixel-based saturation adjusting unit 220, and a saturation component synthesizing unit 230, for example.

The image-based saturation adjusting unit 210 may determine a first saturation adjustment value based on an average luminance value of the converted image, for example.

Here, the input image may be acquired by way of an image sensor of a corresponding image acquiring element, such as part of a digital camera or a digital camcorder. When the average luminance value of the input image is small, the average luminance value of the converted image is also small. Therefore, in order to generate an acquired image with a large average luminance value, an image sensor of an image acquiring system should be exposed for a longer time or the gain of the image sensor increased. In this way, it is possible to increase the average luminance value of the converted image. However, in both cases, the probability that noise will occur increases.

For this reason, according to an embodiment, the image-based saturation adjusting unit 210 may set the first saturation adjustment value to be in direct proportion, for example, to the average luminance value of the converted image so as to suppress the saturation improvement of noise generated in the image acquiring process. As a result, it is possible to prevent the image quality from deteriorating due to noise actually being emphasized when color improving is performed. As such an example, the relationship between the average luminance value and the first saturation adjustment value will be describe in greater detail below with reference to FIG. 3A.

In addition, since the first saturation adjustment value, e.g., as determined by the image-based saturation adjusting unit 210, may be influenced by the average luminance value, it can effectively act in a case of performing saturation adjusting on a moving picture whose average luminance continuously varies.

The pixel-based saturation adjusting unit 220 may determine a second saturation adjustment value, e.g., based on respective input pixel luminance values of the converted image.

The image may be compressed when undergoing a storage process or a transmission process, for example, and because of the compression process there is an increased probability that noise will occur around a specific pixel value. The pixel-based saturation adjusting unit 220 may, thus, set the second saturation adjustment value to be in direct proportion to the input pixel luminance value so as to suppress the saturation improvement of noise, such as MPEG noise, occurring in the vicinity of the specific pixel value. An example relationship between the input pixel luminance value and the second saturation adjustment value will be describe in greater detail below with reference to FIG. 3B.

In addition, since such a second saturation adjustment value determined by the pixel-based saturation adjusting unit 220 is influenced by the input pixel luminance value, it can effectively perform adjustment of the image saturation without also amplifying noise.

The saturation component synthesizing unit 230 may, thus, reflect within the converted image the first saturation adjustment value determined by the image-based saturation adjusting unit 210 and the second saturation adjustment value determined by the pixel-based saturation adjusting unit 220 so as to generate the first output image. At this time, the saturation component synthesizing unit 230 may reflect the first saturation adjustment value and the second saturation adjustment value in the saturation components of the individual pixels transmitted from the saturation component extracting unit 110 so as to generate the modified saturation components and provide the first output image using the modified saturation components (e.g., reference symbol S' in FIG. 1) and other coordinate values (e.g., reference symbols H and V in FIG. 1).

According to one embodiment, the saturation component synthesizing unit 230 can calculate the modified saturation components by using the below Equation 1, for example.

$$\text{Output\_}Si = \text{Input\_}Si + \Delta Si + \Delta Sall. \quad \text{Equation 1}$$

Here, Output_Si represents an example modified saturation component, that is, a final saturation value for each pixel making up the input image, Input_Si represents an input saturation value of each pixel and can be extracted from the converted image, e.g., by the saturation component extracting unit 110, ΔSall represents the first saturation adjustment value, e.g., as determined by the image-based saturation adjusting unit 210, and ΔSi represents the second saturation adjustment value, e.g., as determined by the pixel-based saturation adjusting unit 220.

Figure 3A:
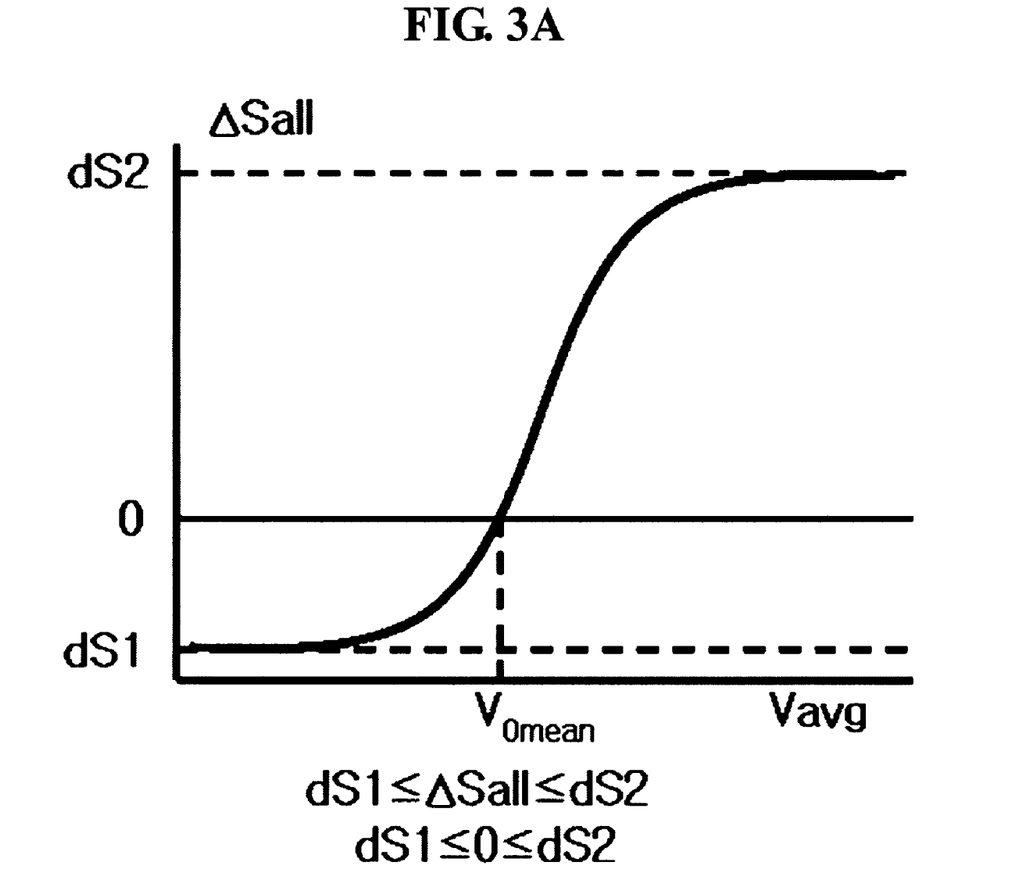
FIG. 3A graphically illustrates the relationship between an average luminance value and a first saturation adjustment value, according to an embodiment of the present invention.

FIG. 3A illustrates an example of a relationship between a first saturation adjustment value and an average luminance value. As noted above, in an embodiment, the average luminance value may be applied to the image-based saturation adjusting unit 210 shown in FIG. 2, for example.

In FIG. 3A, an average luminance zero value V0mean is an average luminance value at which a change value for saturation improvement is 0, i.e., where no change may need to be made to the saturation component, and thus can be used as a reference value for determining whether to increase or decrease each of the saturation components. The average luminance zero value V0mean may be automatically updated according to an attribute of an image desired to be acquired or may be selectively updated by a user. Alternatively, similar to embodiments implemented by the inventors of the present invention, the average luminance zero value V0mean may be fixed to a value that could be empirically selected without excessive experimentation. Here, this described method of setting the average luminance zero value V0mean should not be interpreted as limiting the invention, but rather as only one example of the same.

In addition, as shown in FIG. 3A, the first saturation adjustment value, according to the average luminance zero value V0mean, may vary between the example minimum value dS1 of the change value for saturation improvement and the example maximum value dS2 of the change value for saturation improvement. The minimum value dS1 and the maximum value dS2 may be experimentally determined, for example. Here, the values set as the minimum value dS1 and the maximum value dS2 should not be interpreted as limiting the invention, but rather just one example. In one embodiment, for example, preferably, the minimum value dS1 is less than or equal to 0 and the maximum value dS2 is greater than or equal to 0.

According to such an embodiment, when the average luminance value of the input image is equal to the average luminance zero value V0mean, the first saturation adjustment amount or value may be 0, and when the average luminance value of the input image is greater than the average luminance zero value V0mean, the first saturation adjustment amount or value may be greater than 0. Similarly, when the average luminance value of the input image is less than the average luminance zero value V0mean, the first saturation adjustment amount or value may be less than 0.

Accordingly, with such an example implementation, it is possible to perform saturation adjustment by increasing or decreasing the saturation components based on the average luminance value of the input image and to reduce noise of a low-luminance image.

The relationship between the average luminance value and the first saturation adjustment value may follow a sigmoid function close to human visual acuity, for example. However, embodiments of the present invention should not be limited thereto. For example, it is possible that a numeral value capable of minimizing the generation of noise, even though the saturation components are changed, may be obtained through a pre-experiment so as to be used to generate an operation representing the relationship between the average luminance value and the first saturation adjustment value. Additional embodiments are also available.

Figure 3B:
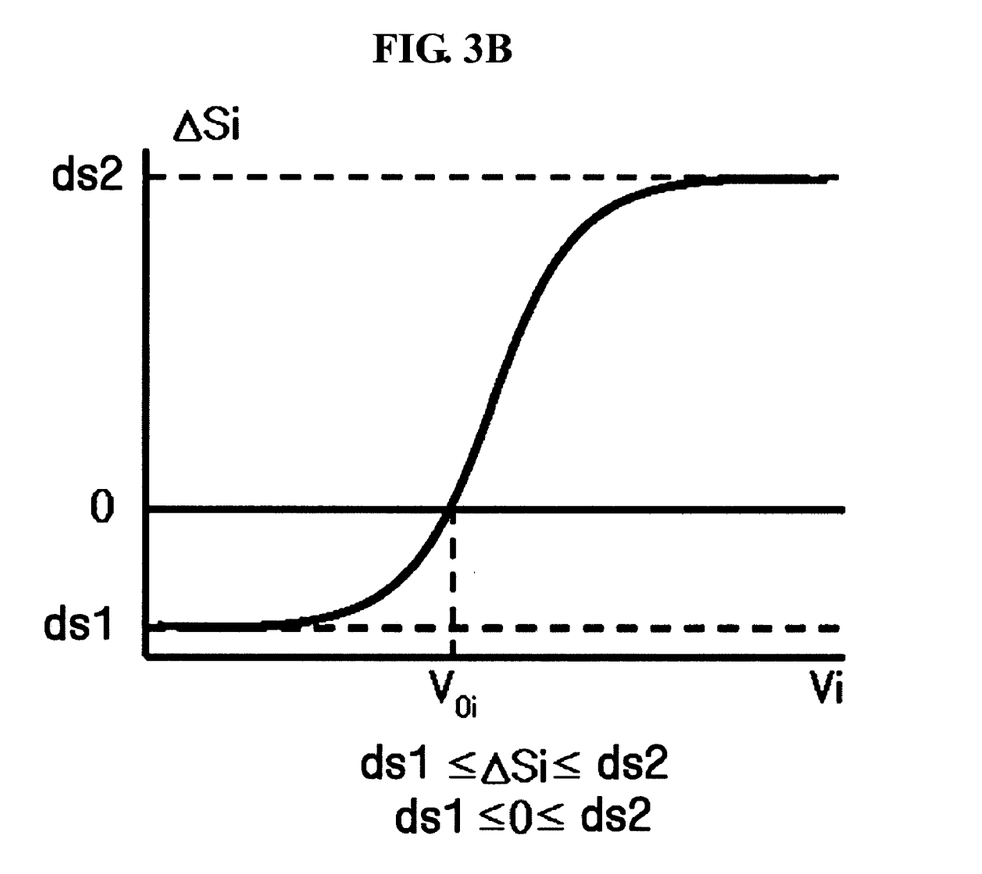
FIG. 3B graphically illustrates the relationship between an input pixel luminance value and a second saturation adjustment value, according to an embodiment of the present invention.

FIG. 3B illustrates an example of a relationship between an input pixel luminance value and a second saturation adjustment value. As noted above, in an embodiment, the input pixel luminance value may be applied to the pixel-based saturation adjusting unit 220 shown in FIG. 2, for example.

In FIG. 3B, a pixel luminance zero value V0$i$ is an input pixel luminance value at which a change value for saturation improvement is 0, i.e., where no change may need to be made to the saturation component, and thus can be used as a reference value for determining whether to increase or decrease each of the saturation components. The pixel luminance zero value V0$i$ may be automatically updated according to an attribute of an image desired to be acquired or be selectively updated by a user. Alternatively, similar to embodiments implemented by the inventors of the present invention, the pixel luminance zero value V0i may be fixed to a value that could be empirically selected without excessive experimentation. Here, this described method of setting the pixel luminance zero value V0$i$ should not be interpreted as limiting the invention, but rather as only one example of the same.

In addition, as shown in FIG. 3B, the second saturation adjustment value, according to the pixel luminance zero value V0$i$, may vary between the example minimum value ds1 of the change value for saturation improvement and the example maximum value ds2 of the change value for saturation improvement. The minimum value ds1 and the maximum value ds2 may be experimentally determined, for example. Here, the values set as the minimum value ds1 and the maximum value ds2 should not be interpreted as limiting the invention, but rather just one example. In one embodiment, for example, preferably, the minimum value ds1 is less than or equal to 0 and the maximum value ds2 is greater than or equal to 0. Here, the minimum value ds1 and the maximum value ds2 may be the same as or different from the minimum value dS1 and the maximum value dS2 described in FIG. 3A, for example.

According to such an embodiment, and as can be seen from FIG. 3B, when the input pixel luminance value of the input image is equal to the pixel luminance zero value V0$i$, the second saturation adjustment amount or value may be 0, and when the input pixel luminance value of the input image is greater than the pixel luminance zero value V0$i$, the second saturation adjustment amount or value may be greater than 0. Similarly, when the input pixel luminance value of the input image is less than the pixel luminance zero value V0$i$, the second saturation adjustment amount or value may be less than 0.

Therefore, with such embodiments, it is possible to perform saturation adjustment by increasing or decreasing the saturation components based on the input pixel luminance value of the input image and to reduce noise of a low-luminance image.

The relationship between the input pixel luminance value and the second saturation adjustment value may follow a sigmoid function close to human visual acuity, for example. However, embodiments of the present invention should not be limited thereto. For example, it is possible that a numeral value capable of minimizing the generation of noise, even though the saturation components are changed, may be obtained through a pre-experiment so as to be used to generate an operation representing the relationship between the input pixel luminance value and the second saturation adjustment value. Additional embodiments are also available.

Thus, when the input image is a low-luminance image having both a bright region and a dark region and the saturation of the bright region of the input image needs to be emphasized, in differing embodiments it is possible to partially increase the saturation, e.g., using the pixel-based saturation adjusting unit 220. Likewise, even when the input image is a high-luminance image having both a bright region and a dark region and the saturation of the dark region of the input image needs to be emphasized, in differing embodiments it is possible to partially increase the saturation, e.g., using the pixel-based saturation adjusting unit 220.

Figure 4:
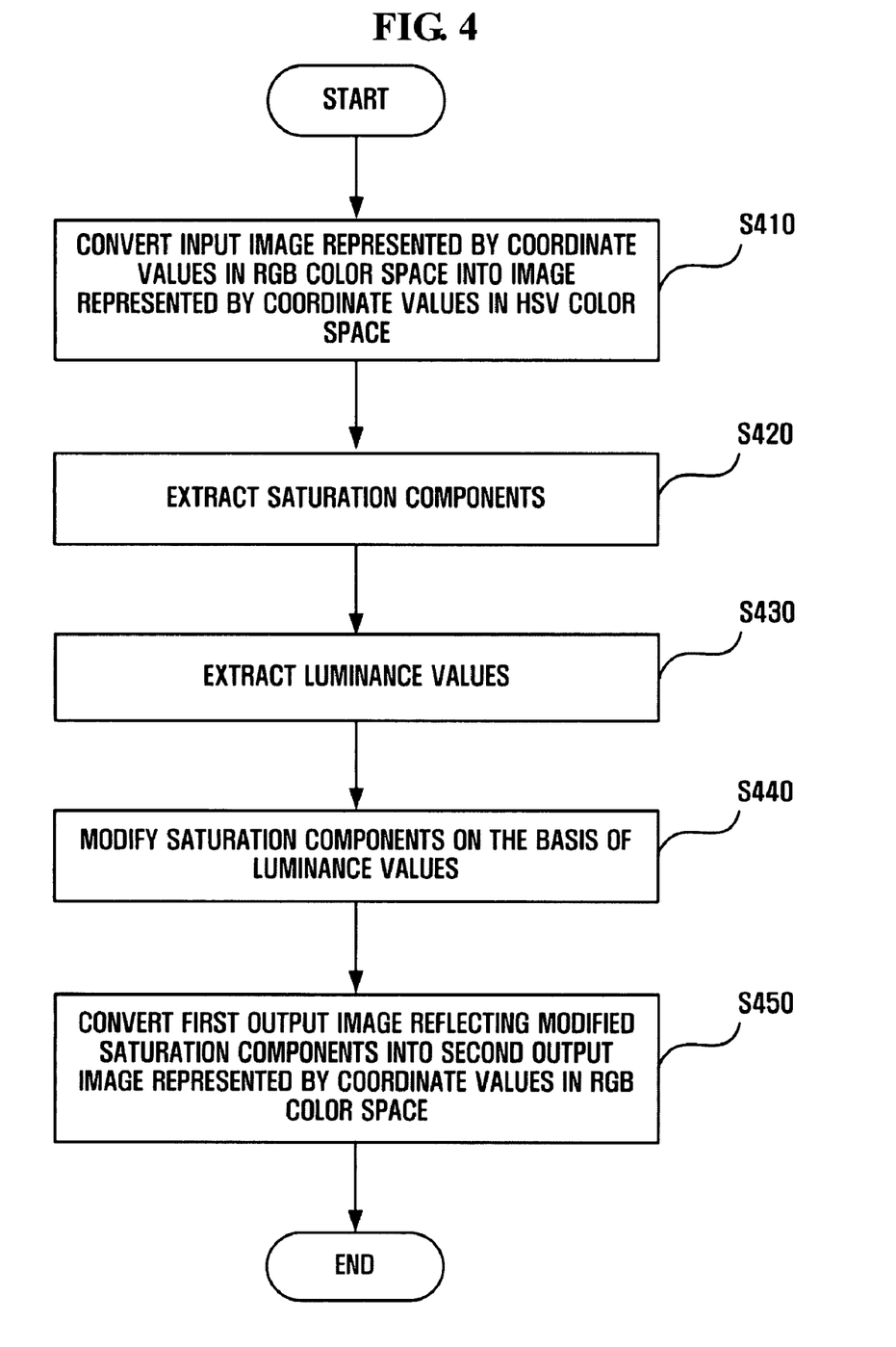
FIG. 4 illustrates a saturation adjusting method, according to an embodiment of the present invention.

FIG. 4 illustrates a saturation adjustment method, according to an embodiment of the present invention.

First, an input image, e.g., represented by coordinate values in an RGB color space as an example of a first color space, (hereinafter, referred to as RGB values) may be converted into the converted image, e.g., represented by coordinate values in an HSV color space as an example of a second color space, (hereinafter, referred to as HSV values), in operation S410.

Thus, in an embodiment, the first color converting unit 105 of FIG. 1, for example, may receive the input image, e.g., as represented by the RGB values, and convert the input image into the converted image, e.g., as represented by the HSV values. Here, it is axiomatic that the first color space is not limited to the RGB color space, and, likewise, it is axiomatic that the second color space is not limited to the HSV color space.

Next, the saturation components of the individual pixels of the converted image may be extracted, in operation S420.

In an embodiment, the saturation component extracting unit 110 of FIG. 1, for example, may receive the converted image from the first color converting unit 105 and extract the saturation components S from the received converted image.

Further, luminance values of the individual pixels of the converted image may be extracted, in operation S430.

Again, in an embodiment, the luminance value extracting unit 120 of FIG. 1, for example, may receive the luminance values V from the first color converting unit 105, convert the received luminance values V into the input pixel luminance values Vpix, and store the input pixel luminance values Vpix in a pixel luminance value storage unit, for example. Then, an average luminance value calculating unit, for example, may calculate the sum of the stored input pixel luminance values Vpix and divide the calculation result by the total number of pixels of the image so as to obtain an average luminance value Vavg.

Here, in this example embodiment, the average luminance value Vavg can be obtained by dividing the image into a plurality of regions having the same size, obtaining average luminance values of the regions, obtaining the sum of the average luminance values, and dividing the sum by the total number of regions, for example, rather than just dividing the sum of the luminance values of the pixels by the total number of pixels. It is axiomatic that various methods similar to those methods are within the technical scope of the invention.

Further, the saturation components may be modified to reflect the average luminance value Vavg, for example, in operation S440.

As noted above, in one embodiment, the image-based saturation adjusting unit 210, for example, may receive the average luminance value Vavg from the luminance value extracting unit 120, also as example, and determine the first saturation adjustment value ΔSall on the basis of the average luminance value Vavg.

Here, when the average luminance value Vavg is equal to the average luminance zero value V0mean, the first saturation adjustment amount or value ΔSall can be considered equal to 0, and when the average luminance value Vavg is greater than the average luminance zero value V0mean, the first saturation adjustment amount or value ΔSall may be greater than 0. Similarly, when the average luminance value Vavg is less than the average luminance zero value V0mean, the first saturation adjustment amount or value ΔSall may be less than 0.

In addition, in an embodiment, the relationship between the average luminance value and the first saturation adjustment value can a sigmoid function considering human visual acuity, again noting that embodiments of the present invention are not limited thereto.

Here, in addition, the pixel-based saturation adjusting unit 220, for example, may receive the input pixel luminance values Vpix from the luminance value extracting unit 120 and determine the second saturation adjustment value ΔSi on the basis of the input pixel luminance values Vpix.

When the input pixel luminance value Vpix is equal to the pixel luminance zero value V0, the second saturation adjustment amount or value ΔSi can be considered equal to 0, and when the input pixel luminance value Vpix is greater than the pixel luminance zero value V0, the second saturation adjustment amount or value ΔSi may be greater than 0. Similarly, when the input pixel luminance value Vpix is less than the pixel luminance zero value V0, the second saturation adjustment amount or value ΔSi may be less than 0.

Again, in an embodiment, the relationship between the input pixel luminance value and the second saturation adjustment value can follow a sigmoid function considering human visible acuity, again noting that embodiments of the present invention are not limited thereto.

Here, the order in which the process of determining the first saturation adjustment value and the process of determining the second saturation adjustment value are performed may be changed.

Further, the saturation component synthesizing unit 230 may reflect the first saturation adjustment value ΔSall and the second saturation adjustment value ΔSi in the saturation components of the individual pixels making up the input image to generate the modified saturation components S', and supply the first output image using the modified saturation components S', the V components, and the H components making up the converted image.

Still further, in operation S450, the coordinate values including the modified saturation components in the HSV color space may be converted into coordinate values in the RGB color space.

In an example embodiment, the second color converting unit 145 may receive HS'V, for example, from the saturation adjusting unit 130, and convert the input HS'V into R'G'B, also as an example, to output the second output image on which the saturation adjusting process has been performed.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Therefore, according to one or more embodiments of the present invention, it is possible to suppress color noise prominence when saturation adjusting process is performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system, including at least one processing element, with adaptive saturation adjustment, the system comprising:
    a saturation component extraction unit to extract saturation components of an image;
    a luminance value extracting unit using the at least one processing element to extract luminance values of the image existing before the extraction of the saturation components of the image; and
    a saturation adjusting unit to selectively adjust the extracted saturation components of select portions of the image based on the extracted luminance values.

2. The system of claim 1, further comprising:
    a first color converting unit to convert an input image, represented by coordinate values in a first color space, into the image, represented by coordinate values in a second color space; and
    a saturation component extracting unit to extract saturation components from the image.

3. The system of claim 2, further comprising:
    a second color converting unit to convert a first output image, reflecting the adjusted respective saturation components, into a second output image, represented by coordinate values in the first color space.

4. The system of claim 1, wherein the extracted luminance values include at least one of an average luminance value of the image and pixel luminance values of respective pixels within the image.

5. A system, including at least one processing element, with adaptive saturation adjustment, the system comprising:
    a luminance value extracting unit using the at least one processing element to extract luminance values of an image; and
    a saturation adjusting unit to selectively adjust respective saturation components of select portions of the image based on the extracted luminance values,
    wherein the extracted luminance values include at least one of an average luminance value of the image and pixel luminance values of respective pixels within the image, and
    wherein the saturation adjusting unit comprises:
    an image-based saturation adjusting unit to determine a first saturation adjustment value based on the average luminance value;
    a pixel-based saturation adjusting unit to determine a second saturation adjustment value based on a respective pixel luminance value; and
    a saturation component synthesizing unit to modify each of the saturation components of the input image based on the first saturation adjustment value and the second saturation adjustment value.

6. The system of claim 5, wherein, when the average luminance value meets a first reference luminance amount, the image-based saturation adjusting unit sets the first saturation adjustment value to be a value that does not change a respective saturation of a respective select portion of the image.

7. The system of claim 6, wherein, when the average luminance value fails to meet the first reference luminance amount, the image-based saturation adjusting unit sets the first saturation adjustment value to be a value that increases the respective saturation of the respective select portion of the image.

8. The system of claim 6, wherein, when the average luminance value fails to meet the first reference luminance amount, the image-based saturation adjusting unit sets the first saturation adjustment value to be a value that decreases the respective saturation of the respective select portion of the image.

9. The system of claim 5, wherein, when the respective pixel luminance value meets a second reference luminance amount, the pixel-based saturation adjusting unit sets the second reference luminance value to be a value that does not change a respective saturation of a respective select portion of the image.

10. The system of claim 9, wherein, when the respective pixel luminance value fails to meet the second reference luminance amount, the pixel-based saturation adjusting unit sets the second saturation adjustment value to be a value that increases the respective saturation of the respective select portion of the image.

11. The system of claim 9, wherein, when the respective pixel luminance value fails to meet the second reference luminance amount, the pixel-based saturation adjusting unit sets the second saturation adjustment value to be a value that decreases the respective saturation of the respective select portion of the image.

12. The system of claim 5, wherein the saturation component synthesizing unit sums an input saturation component, the first saturation adjustment value, and the second saturation adjustment value for each of the pixels making up the input image when modifying each of the saturation components of the input image.

13. The system of claim 1, wherein the system is one of an image display system, image generating system, and image processing chip and/or hardware system including the luminance value extracting unit and the saturation adjusting unit for corresponding image display and/or image generation.

14. A method with adaptive saturation adjustment, the method comprising:
    extracting saturation components of an image;
    extracting, using at least one processing element, luminance values of the image existing before the extraction of the saturation components of the image; and
    selectively adjusting the extracted saturation components of select portions the image based on the extracted luminance values.

15. The method of claim 14, further comprising:
    converting an input image, represented by coordinate values in a first color space, into the image, represented by coordinate values in a second color space; and
    extracting saturation components from the image.

16. The method of claim 15, further comprising
    converting a first output image, reflecting the adjusted respective saturation components, into a second output image, represented by coordinate values in the first color space.

17. The method of claim 14, wherein the extracting of the luminance values comprises:
    extracting pixel luminance values of respective pixels within the image; and
    extracting an average luminance value of the image based on the input pixel luminance values.

18. A method with adaptive saturation adjustment, the method comprising:
    extracting, using at least one processing element, luminance values of an image; and selectively adjusting respective saturation components of select portions the image based on the extracted luminance values, wherein the extracting of the luminance values comprises:

extracting pixel luminance values of respective pixels within the image; and extracting an average luminance value of the image based on the input pixel luminance values, wherein the selective adjusting of the respective saturation components comprises:

determining a first saturation adjustment value based on the average luminance value;

determining a second saturation adjustment value based on a respective pixel luminance value; and modifying each of the saturation components of the input image based on the first saturation adjustment value and the second saturation adjustment value.

19. The method of claim 18, wherein the determining of the first saturation adjustment value comprises setting the first saturation adjustment value to a value that does not change a respective saturation of a respective select portion of the image when the average luminance value meets a first reference luminance amount.

20. The method of claim 19, wherein the determining of the first saturation adjustment value comprises setting the first saturation adjustment value to a value that increases the respective saturation of the respective select portion of the image when the average luminance value fails to meet the first reference luminance amount.

21. The method of claim 19, wherein the determining of the first saturation adjustment value comprises setting the first saturation adjustment value to a value that decreases the respective saturation of the respective select portion of the image when the average luminance value fails to meet the first reference luminance amount.

22. The method of claim 18, wherein the determining of the second saturation adjustment value comprises setting the second reference luminance value to be a value that does not change a respective saturation of a respective select portion of the image when the respective pixel luminance value meets a second reference luminance amount.

23. The method of claim 22, wherein the determining of the second saturation adjustment value comprises setting the second saturation adjustment value to be a value that increases the respective saturation of the respective select portion of the image when the input pixel luminance value fails to meet the second reference luminance amount.

24. The method of claim 22, wherein the determining of the second saturation adjustment value comprises setting the second saturation adjustment value to be a value that decreases the respective saturation of the respective select portion of the image when the input pixel luminance value fails to meet the second reference luminance amount.

25. The method of claim 18, wherein the modifying of the saturation components comprises summing an input saturation component, the first saturation adjustment value, and the second saturation adjustment value for each of the pixels making up the input image when modifying each of the saturation components of the input image.

26. At least one non-transitory computer readable medium comprising computer readable code to control at least one processing element to implement the method of claim 14.

27. A system, including at least one processing element, with adaptive saturation adjustment, the system comprising:

a luminance value extracting unit using the at least one processing element to identify respective luminance values for one or more select pixels of an image, less than all pixels of the image, and identifying average luminance values of the image; and a saturation adjusting unit to selectively adjust saturation components of select pixels, less than all pixels of the image, of the image based on the identified respective luminance values for the one or more select pixels and adjust saturation components of the input image based on the identified average luminance values.

28. A method of adaptive saturation adjustment, the method comprising:

identifying, using at least one processing element, luminance values for one or more select pixels of an image, less than all pixels of the image, and identifying average luminance values of the image; and selectively adjusting saturation components of select pixels, less than all pixels of the image, of the image based on the identified luminance values for the one or more select pixels and adjusting saturation components of the input image based on the identified average luminance values.

29. At least one non-transitory computer readable medium comprising computer readable code to control at least one processing element to implement the method of claim 28.

* * * * *

UNITED STATES PATENT AND TRADEMARK OFFICE
CERTIFICATE OF CORRECTION

Page 1 of 1

PATENT NO. : 8,009,905 B2
APPLICATION NO. : 11/892653
DATED : August 30, 2011
INVENTOR(S) : Won-hee Choe et al.

It is certified that error appears in the above-identified patent and that said Letters Patent is hereby corrected as shown below:

In Column 10, Line 45, In Claim 14, after "portions" insert --of--.

In Column 10, Line 53, In Claim 16, after "comprising" insert --:--.

In Column 11, Line 2, In Claim 18, after "portions" insert --of--.

Signed and Sealed this
Thirty-first Day of January, 2012

David J. Kappos
*Director of the United States Patent and Trademark Office*